TIME RECORDER FOR PLURAL EVENTS REGISTRATION

Filed June 25, 1949 2 Sheets-Sheet 1

INVENTOR.
LEWIS W. IMM
BY
Naylor and Lassagne
ATTORNEYS

July 20, 1954 L. W. IMM 2,684,279

TIME RECORDER FOR PLURAL EVENTS REGISTRATION

Filed June 25, 1949 2 Sheets-Sheet 2

INVENTOR.

LEWIS W. IMM

BY

Naylor and Lassagne

ATTORNEYS

Patented July 20, 1954

2,684,279

UNITED STATES PATENT OFFICE 2,684,279

TIME RECORDER FOR PLURAL EVENTS REGISTRATION

Lewis W. Imm, Los Angeles, Calif., assignor to Librascope, Incorporated, Glendale, Calif., a corporation of California Application June 25, 1949, Serial No. 101,315

8 Claims. (Cl. 346—123)

The present invention relates to recorders and more particularly to recorders of the type in which a stylus is employed to inscribe a record on a chart or record sheet moved relatively to the stylus.

The invention has as a primary object the provision of a simple, compact and efficient recorder capable of recording events occurring over an extended period of time.

Further and more specific objects include the provision of novel means for producing differentiated recordings of multiple events and the improvement and simplification of the mechanical arrangement of recorders generally.

The foregoing, together with additional objects and advantages of the invention are attained, in summary, by employing a common driving means to both move the record with respect to the stylus and to impart to the stylus a different movement with respect to the record so that, in the example shown in the drawings, a spiral record is produced which extends around the circular record sheet any desired number of times. Recording of events occurring within the time span represented by such a spiral is effected by imparting additional movements to the stylus independently of the movement thereof which is synchronized with the movement of the record sheet, so as to cause deviations in the inscribed spiral. Means are provided whereby a plurality of distinguishably different deviations of this kind may be caused, selectively.

In the accompanying drawings disclosing a preferred embodiment of the invention:

As shown in the accompanying drawings, the illustrated embodiment of the invention comprises a back plate 10 to which are secured, as by riveting, three spacers in the form of posts 11 to the opposite ends of which a main plate 12 is secured, as by screws 13.

Figure 5:
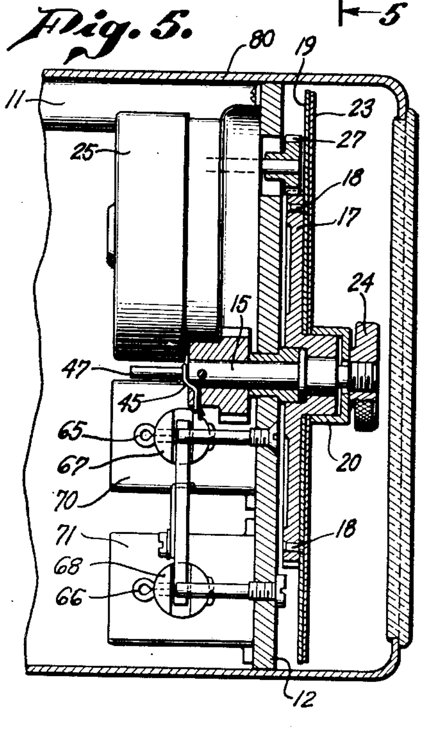
Figure 5 is a partial view in section taken on the line 5—5 of Figure 4.

Journaled in a bushing 14 in the main plate 12 is a spindle 15 and rotatably mounted adjacent one end of the spindle 15 is a chart gear 17 to which there is secured, as by rivets 18, a chart plate 19. A collar 20 having a free fit over a hub 21 of the chart gear 17 and provided with an aperture 22 through which extends the spindle 15 is adapted to be pressed against a removable chart 23 laid upon the chart plate 19 by a nut 24 threaded upon one end of the spindle 15 as shown in Figure 5.

This arrangement whereby the collar 20 and nut 24 perform the two functions of retaining a removable chart in fixed relation to the chart plate 19 and of releasably clutching the spindle 15 to the chart gear 17 constitutes an important feature of the present invention, as will appear more clearly in connection with the description of the operation of the recorder.

Mounted on the main plate 12 is a conventional time drive device illustrated as a synchronous motor 25 of the kind commonly used to drive electric clocks. The motor pinion 27 extends through an aperture in main plate 12 into mesh with the chart gear 17, driving the same preferably but not necessarily at the rate of one rotation for each 24 hours.

For the purpose of inscribing a record on a chart held on the chart plate 19 as above described, the recorder of the present invention employs a marking device movably mounted with respect to the chart plate. This device comprises a shaft 30 journaled in a bushing 31 in main plate 12 and having secured to one end thereof a rectangular block 32. A stylus arm 33 is recessed at one end to receive the block 32 and is pivotally secured to said block by a pin 34. The stylus arm 33 is normally held in the operating position in which it is shown, by a leaf spring 35 riveted to the arm 33 and having its free end bent into engagement with a corner of the block 32 so as to lightly press the arm 33 toward the chart plate 19. However the arm 33 can be easily raised away from the chart plate by manually rocking it about pivot pin 34 against the tension of spring 35. Adjacent the free end of arm 33 a marking device or stylus 37 of any desired type is fixed, as by frictional engagement within a slot 38 in arm 33.

A further important feature of the present invention is the provision of a simple and effective arrangement making possible the recording of data during a plurality of rotations of the record sheet or chart, so that, for instance, events occurring during an entire week may be recorded on a chart driven at the rate of one rotation per day.

Figure 2:
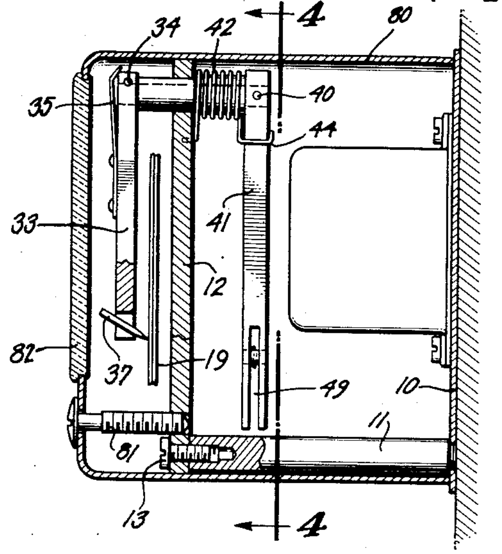
Figure 2 is a view in section taken on the line 2—2 of Figure 1.
Figure 3:
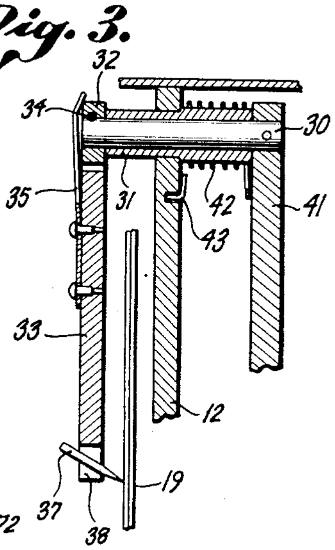
Figure 3 is a detail view in section taken on the line 3—3 of Figure 1.

For this purpose, the shaft 30 has secured to it, as by a pin 40, an actuating arm 41 which is adapted to be rocked to cause the stylus arm 33 to move from a position in which the stylus 37 is adjacent the outer edge of record sheet 23 to positions inwardly thereof. A torsion spring 42 coiled about bushing 31 has one end projecting into a recess 43 in main plate 12 and its opposite end engaged with arm 41, as at 44 (Fig. 2) so as to urge the stylus 37 to its outermost position with respect to the record sheet.

Progressive inward movement of the stylus 37 with respect to record sheet 23 in timed relationship to the rotation of the sheet by motor 25 is effected by an operating connection in the form of a flexible cable or cord 45 one end of which is secured to an extension 47 of spindle 15 so as to be helically wound upon said spindle as the same is rotated by motor 25. From this anchorage the cord 45 passes freely over a pin 48 fixed in a slot 49 of arm 41, so that said pin acts as a sheave for the cord; and the opposite end of the cord 45 is anchored to a link 50, as by a screw 52.

Figure 1:
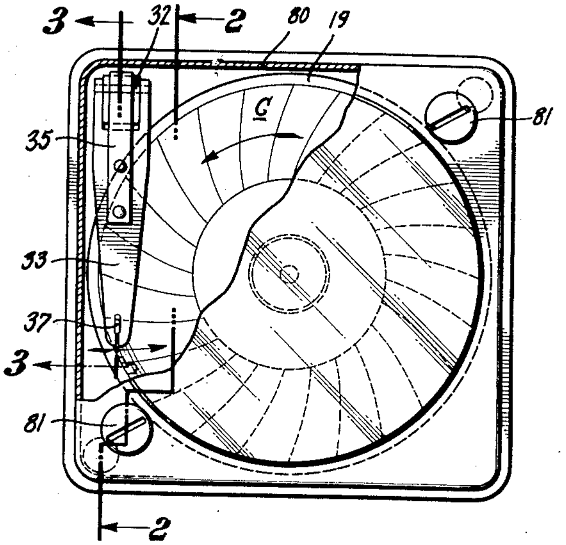
Figure 1 is a view in frontal elevation with a portion of the casing broken away to expose the stylus arm.
Figure 4:
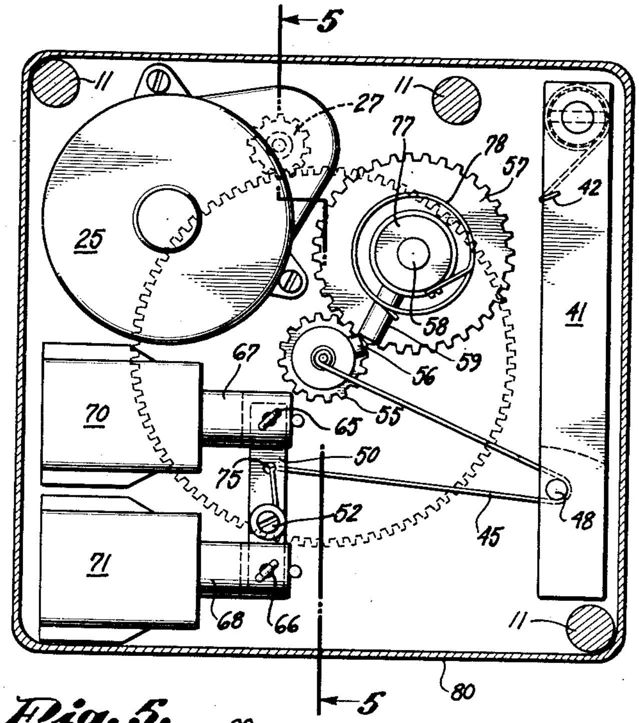
Figure 4 is a view in section taken on the line 4—4 of Figure 2.

Considering for the moment the connection of the cord 45 to the link 50 as a fixed anchorage, this arrangement is such that as the spindle 15 is rotated by motor 25, the cord 45 will be wound upon the spindle's extension 47 and the arm 41 will be progressively rocked clockwise as viewed in Figure 4, rocking the arm 33 counterclockwise as viewed in Figure 1 and moving the stylus 37 inwardly with respect to the record sheet.

Figure 6:
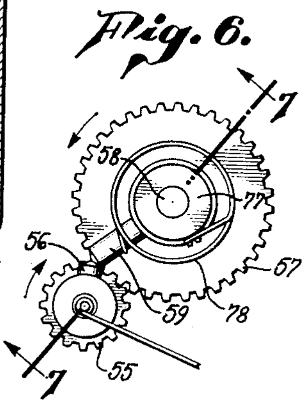
Figure 6 is a detail view of the resetting mechanism.

Limitation of the movement of the stylus inwardly and outwardly is effected by a stop device. Essentially this stop device consists of a gear 55 secured to the spindle 15 and provided with a stop pin 56; said gear meshing with a stop gear 57 rotatably mounted on a countershaft 58 fixed in the main plate 12, and being provided with a stop pin 59. When the arm 41 is in its outermost position the stop pins 56 and 59 come into end to end contact as shown in Figure 4, thus preventing further outward movement of the arm, while when the arm 41 reaches the innermost position to which it is desired to cause it to move, the pins 56 and 59 come into end to end contact as shown in Figure 6, and further winding up of cord 45 on the portion 47 of spindle 15 is prevented. The motor 25 is provided with a built in friction slip device to prevent motor stalling under this condition. The ratio of gears 55 and 57 is such that the pins 56 and 59 come into end to end contact only under the described conditions although each gear makes several revolutions between such contacts.

From the description of the structure thus far it will be evident that the operation of the parts described will cause the stylus to inscribe an undeviating spiral line from its starting point adjacent the outer edge of the record sheet to its stopping point inwardly thereof. Events occurring at any points in the period represented by this line are recorded by causing deviations from the line, and a further important feature of the present invention is the novel means provided for effecting such deviation, with or without means for effecting a plurality of distinguishably different deviations for the purpose of recording different events or multiples of an identical event.

Figure 8:
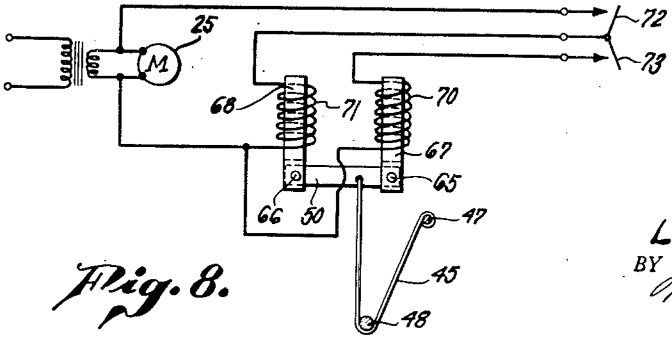
Figure 8 is a wiring diagram.

For the purpose of effecting such deviations a rockable member exemplified by the link 50 is provided to which one end of the cord 45 is anchored. The link 50 is pivotally supported at spaced points by pins 65 and 66 passing through holes in the slotted ends of solenoid armatures 67 and 68. As shown in Figure 8, the windings 70 and 71 within which the armatures move are connected into normally open control circuits in parallel with the motor 25, so that upon closure of either or both of these control circuits, as by switches 72 and 73 either or both of the armatures 67, 68 will be shifted leftwardly to either rock the link 50 around one or the other of its pivotal supports or translate it bodily to the left without rocking movement. A pull is thus exerted on the cord 45 which, by rocking the arm 41 slightly inwardly, causes the stylus 37 to deviate from the line initially traced by it and to trace a spiral line offset inwardly from the initial spiral so long as solenoid energization is maintained. Upon deenergization, spring 42 will move the arm 41 outwardly again and tracing of the initial spiral will be resumed.

A particular feature of the present invention is the arrangement whereby by the use of only two actuating devices such as identical solenoids 70 and 71 for link 50, three distinguishably different deviations from the initial spiral can be effected. In order to obtain this effect, the effective point of connection between cord 45 and link 50 is situated at a point non-equidistant from the pivotal supports 65 and 66 of the link 50, as by passing the cord 45 through a hole 75 so situated, although it would be equally efficacious to locate the anchoring screw 52 at such a point.

This arrangement is such that the energization of solenoid 71 alone will shift the effective anchorage point 75 a short distance; energization of solenoid 70 alone will shift the effective anchorage point 75 a longer distance; and energization of both solenoids at once will shift the effective anchorage point 75 a still longer distance. Correspondingly differentiated inward shifts of the stylus 37 will, of course, accompany these movements and will produce three distinguishable deviations from the initial spiral. The total inward movement of stylus 37 effected by the energization of both solenoids is preferably less than the inward movement of the stylus brought about by a complete revolution of spindle 15, so that there is no overlapping of the inscribed line under any circumstance.

Figure 7:
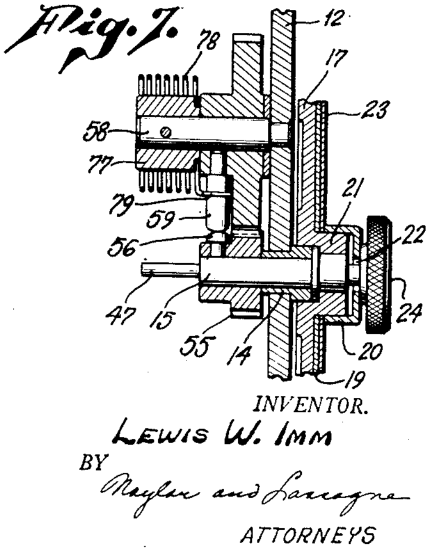
Figure 7 is a detail view in section of the resetting and other mechanisms taken on the line 7—7 of Figure 6.

Resetting of the marking device to its outermost starting position is automatically effected upon removal of a chart or record sheet from the chart plate 19. For this purpose, there is secured to the countershaft 58 (Figs. 4, 6 and 7) a collar 77 to which is anchored one end of a torsion spring 78. The opposite end of spring 78 is bent around the stop pin 59 as indicated at 79 so that, as soon as the nut 24 is loosened sufficient to permit the spindle 15 to rotate independently of the chart gear 17, spring 78 assisted by spring 42 will rotate the spindle 15 to unwind cord 45 from the spindle extension 47 and move the marking device to extreme outward position.

The entire mechanism which has been described, except for the switches 72 and 73 with their electrical connections, is preferably enclosed in a casing 80 removably secured to the main plate 12, as by screws 81, and provided with a transparent window 82 for viewing the record sheet.

In preparing the recorder for operation, screws 81 are loosened sufficiently to permit removal of the casing 80 and nut 24 is then removed from spindle 15. Since this nut together with collar 20 forms a part of the driving connection between the chart gear 17 and the spindle 15, the loosening of nut 24 permits springs 42 and 78 to reset the marking device to its outermost position, in which it is shown in Figure 1. During such resetting the motor 25 may continue to drive the chart gear 17 which, being declutched from the spindle 15, does not interfere with the resetting.

Collar 20 and any record sheet which may be in position on the chart plate 19 are next removed, stylus arm 33 being rocked upwardly about its pivot 34 to facilitate such removal of the sheet, and a new record sheet or chart such as that illustrated at C in Figure 1 is placed in position. Collar 20 and nut 24 are then replaced; but before the nut 24 is tightened the record sheet is adjusted by rotating it with respect to chart plate 19 so that any time indications borne by the record sheet will be correctly aligned with the stylus 37. The nut 24 is then tightened to hold the sheet in place on the chart plate 19 and to reclutch the chart gear 17 to spindle 15, and arm 33 is rocked downwardly about its pivot 34 to engage the stylus 37 with the new record sheet. The casing 80 is then replaced, and the recording has commenced.

If thereafter, during the operation of the recorder, the switch 72 be closed the winding 71 will be energized and the stylus 37 will be abruptly moved a short distance inwardly causing a deviation in the inscribed record and the inscribing of a spiral paralleling the original spiral record as long as the switch remains closed. Upon opening of switch 72, however, the winding 71 will be deenergized and the stylus 37 will be abruptly returned to the original spiral path.

If, instead, the switch 73 be closed the winding 70 will be energized and the stylus 37 will be abruptly moved inwardly a greater distance causing a distinguishably different deviation in the inscribed record from that caused by closure of switch 71. Similarly, however, the inscribing of the third possible spiral thus effected will be maintained as long as this switch remains closed and when it is opened the stylus will be abruptly returned to the original spiral path.

If switches 72 and 73 be simultaneously or concurrently closed both winding 71 and winding 70 will be energized and the stylus 37 will be abruptly moved inwardly a still greater distance than it would be moved as a result of the closure of either switch alone causing a deviation in the inscribed record distinguishably different from that resulting from the closure of either switch alone. Similarly, however, the inscribing of the fourth possible spiral thus effected will be maintained as long as both switches remain closed, and when both are opened the stylus will be abruptly returned to the original spiral path.

It will be evident that if switches 72 and 73 are closed and opened in sequence, shifts into the four possible spiral paths will take place sequentially.

The uses to which recorders of the present invention may be applied are manifold, including the recording of watchman's check-ins at remote stations at which the switches 72 and 73 may be located, and many others. Of course more or less than the two solenoid control devices 70 and 71 may be employed in various applications and many other adaptations of the recorder to suit it to various applications will occur to those familiar with the recording art. It is intended therefore that the invention shall not be limited by the specific example of an embodiment thereof which has been illustrated and described except as required by the lawful interpretation of the following claims.

I claim:

1. In a recorder having a record sheet holder and a marker associated therewith, the combination of a driving motor, means operable by said motor for moving said holder with respect to said marker, marker actuating means connected to said marker and concurrently operable from said motor to gradually move said marker with respect to said holder in a direction different from the direction of relative movement effected by said holder moving means, the motor operated actuating mechanism for said marker actuating means comprising a mechanical element having an operating connection with said marker actuating means and with said driving motor, and means for imparting to said marker movement additional to that imparted thereto by said motor, comprising a rockable member and a third operating connection between said mechanical element and said rockable member.

2. In a recorder having a record sheet holder and a marker associated therewith, the combination of a driving motor, means operable by said motor for moving said holder with respect to said marker, marker actuating means connected to said marker and concurrently operable from said motor to gradually move said marker with respect to said holder in a direction different from the direction of relative movement effected by said holder moving means, the motor operated actuating mechanism for said marker actuating means comprising a mechanical element having an operating connection with said marker actuating means and with said driving motor, and means comprising a pair of solenoids and a linkage between the cores of said solenoids having an operating connection with said mechanical element for imparting to said element different movements additional to the movement imparted thereto by said motor.

3. In a recorder having a record sheet holder and a marking device movably mounted with respect thereto to inscribe a record on a sheet held thereon; the combination of a driving motor, means operable by said motor for effecting movement of said holder with respect to said device and means operable by said motor for concurrently moving said marking device with respect to said holder in a direction different from the direction of relative movement effected by said first mentioned means; with means for moving said marking device to cause deviations of differing magnitude in said inscribed line comprising a link pivotally supported at spaced points, an operating connection between said marking device and a point on said link nonequidistant from said spaced points, and means for shifting said pivotal supports whereby movements of different magnitude will be transmitted from said link through said operating connection to said marking device upon shifting of the one or the other of said supports.

4. In a recorder having a record sheet holder and a marking device movably mounted with respect thereto to inscribe a record on a sheet held thereon; the combination of means for effecting relative movement of said holder and said device to inscribe an undeviating line on such a sheet with means for moving said marking device to cause deviations of differing magnitude in said inscribed line comprising a link pivotally supported at spaced points on electrically shiftable supports, a motion transmitting connection between said marking device and a point on said link non-equidistant from its pivotal connection to said supports, and circuit controls for shifting either or both supports, selectively, to thereby move said point of connection differing distances, whereby triple deviation movements of differing magnitude can be transmitted from said link to said marking device.

5. In a recorder having a record sheet holder and a marking device movably mounted with respect thereto to inscribe a record on a sheet held thereon; the combination of means for effecting relative movement of said holder and said device to inscribe an undeviating line on such a sheet with means for moving said marking device to cause deviations in said inscribed line comprising an adjustable actuator and a cord connection between said actuator and said first mentioned means including a portion in free engagement with an element of said marking device.

6. In a recorder having a record sheet holder and a marker associated therewith, the combination of a driving motor, means operable by said motor for moving said holder with respect to said marker, marker actuating means connected to said marker and concurrently operable from said motor to gradually move said marker with respect to said holder in a direction different from the direction of relative movement effected by said holder moving means, the motor operated actuating mechanism for said marker actuating means comprising a mechanical element having an operating connection with said marker actuating means and with said driving motor, and means for imparting to said marker movement in the same direction as the movement imparted thereto by said motor but additional thereto, comprising a rockable member and a third operating connection between said mechanical element and said rockable member.

7. In a recorder having a record sheet holder and a marker associated therewith, the combination of a driving motor, means operable by said motor for moving said holder with respect to said marker, marker actuating means connected to said marker and concurrently operable from said motor to gradually move said marker with respect to said holder in a direction different from the direction of relative movement effected by said holder moving means, the motor operated actuating mechanism for said marker actuating means comprising a mechanical element having an operating connection with said marker and with said driving motor, and means comprising a pair of solenoids and a linkage between the cores of said solenoids having an operating connection with said mechanical element for imparting to said element different movements additional to but in the same direction as the movement imparted thereto by said motor.

8. In a recorder having a rotatable record sheet holding disk, and a marker mounted for oscillatory movement along a path toward and away from the axis of rotation of said disk; the combination of a driving motor, means operable by said motor for rotating said disk, marker actuating means connected to said marker and concurrently operable from said motor to gradually move said marker with respect to said disk along said path; said marker actuating means comprisa mechanical element having an operating connection with said motor and an operating connection with said marker, and means comprising a solenoid having an operating connection with said mechanical element for imparting to said element movement additional to the movement imparted thereto by said motor.

References Cited in the file of this patent

UNITED STATES PATENTS

| Number | Name | Date |
|---|---|---|
| 1,255,968 | Williamson | Feb. 12, 1918 |
| 1,322,148 | Sprague | Nov. 18, 1919 |
| 2,051,986 | Cool | Aug. 25, 1936 |
| 2,068,663 | Diehl | Jan. 26, 1937 |

FOREIGN PATENTS

| Number | Country | Date |
|---|---|---|
| 633,830 | Germany | Aug. 7, 1936 |